United States Patent
Nagaraj et al.

(10) Patent No.: US 8,867,336 B2
(45) Date of Patent: Oct. 21, 2014

(54) SYSTEM FOR EARLY DETECTION OF DECODING ERRORS

(75) Inventors: Thadi Nagaraj, San Diego, CA (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 886 days.

(21) Appl. No.: 11/297,558

(22) Filed: Dec. 7, 2005

(65) Prior Publication Data

US 2007/0071009 A1  Mar. 29, 2007

Related U.S. Application Data

(60) Provisional application No. 60/721,824, filed on Sep. 28, 2005.

(51) Int. Cl.
*G01R 31/08* (2006.01)
*H04L 1/18* (2006.01)
*H04L 1/00* (2006.01)

(52) U.S. Cl.
CPC ....... *H04L 1/1854* (2013.01); *H04L 2001/0093* (2013.01); *H04L 1/0009* (2013.01); *H04L 1/1819* (2013.01); *H04L 1/1835* (2013.01); *H04L 1/0057* (2013.01); *H04L 1/0045* (2013.01)
USPC ........... 370/218; 370/242; 370/252; 714/748; 714/751

(58) Field of Classification Search
CPC .......................... H04L 1/0091; H04L 1/1845
USPC ......... 370/242–245, 252–253, 336–338, 218, 370/389, 349–350, 392, 465, 410–415, 370/471–476; 714/746–751; 709/220–222, 709/227–229, 237
See application file for complete search history.

(56) References Cited

U.S. PATENT DOCUMENTS

| | | | |
|---|---|---|---|
| 5,703,883 A | 12/1997 | Chen | |
| 6,438,105 B1 | 8/2002 | Qarni | |
| 6,486,803 B1 | 11/2002 | Luby et al. | |
| 6,665,832 B1 * | 12/2003 | Neufeld et al. | 714/786 |
| 6,845,238 B1 | 1/2005 | Mueller | |
| 6,999,921 B2 * | 2/2006 | Harris et al. | 704/215 |
| 7,123,617 B1 * | 10/2006 | Abrol | 370/394 |
| 7,236,494 B2 * | 6/2007 | Mallory | 370/394 |

(Continued)

FOREIGN PATENT DOCUMENTS

| | | |
|---|---|---|
| DE | 19813507 A1 | 9/1999 |
| EP | 0673175 A2 | 9/1995 |

(Continued)

OTHER PUBLICATIONS

McKinley et al. "An Experimental Study of Adaptive Forward Error Correction for Wireless Collaborative Computing.", Jan. 8-12, 2001, pp. 157-166.*
C. Sasaki et al., "Proposal of Unicast Retransmission Mechanism for Reliable Multicast with XOR-based FEC", IEICE Technical Report, Japan, the Institute of Electronics, Information and Communication Engineers, Feb. 25, 2005, vol. 104, No. 692, pp. 223-226.
International Search Report—PCT/US06/038537—International Search Authority, European Patent Office—Feb. 20, 2007.

(Continued)

*Primary Examiner* — Redentor Pasia
(74) *Attorney, Agent, or Firm* — Fulbright & Jaworski LLP

(57) ABSTRACT

System for early detection of decoding errors. A method is provided for detecting a decode failure. The method includes receiving an initial amount of code packets, detecting a trigger event that indicates a decode failure associated with the initial amount of code packets, and receiving one or more additional code packets.

59 Claims, 5 Drawing Sheets

(56) References Cited

U.S. PATENT DOCUMENTS

| | | | |
|---|---|---|---|
| 2003/0076810 A1* | 4/2003 | Rezaiifar et al. | 370/349 |
| 2003/0159099 A1* | 8/2003 | Vukovic et al. | 714/749 |
| 2003/0210669 A1* | 11/2003 | Vayanos et al. | 370/335 |
| 2004/0148552 A1* | 7/2004 | Matsumoto et al. | 714/712 |
| 2006/0250949 A1* | 11/2006 | Ramakrishnan et al. | 370/216 |

FOREIGN PATENT DOCUMENTS

| | | |
|---|---|---|
| JP | 09116559 | 5/1997 |
| JP | 11136220 A | 5/1999 |
| JP | 2002527939 | 8/2002 |
| JP | 2005514828 T | 5/2005 |
| KR | 1020010107737 | 12/2001 |
| KR | 200317349 | 3/2003 |
| RU | 2259636 | 8/2005 |
| SU | 1190525 | 11/1985 |
| UA | 72441 | 3/2005 |
| WO | WO9727685 | 7/1997 |
| WO | WO9943178 | 8/1999 |
| WO | WO0021236 A1 | 4/2000 |
| WO | WO0120942 | 3/2001 |
| WO | WO03056703 | 7/2003 |
| WO | WO2005055640 | 6/2005 |

OTHER PUBLICATIONS

Taiwanese Search report—095136044—TIPO—Jul. 20, 2009.

Written Opinion—PCT/US06/038537—International Search Authority, European Patent Office—Feb. 20, 2007.

McKinley, P.K. et al., "An experimental study of adaptive forward error correction for wireless collaborative computing", Applications on the Internet, 2001. IEEE Computer, Society, United States, Jan. 8, 2001, pp. 157-166. (XP010532809).

Rubenstein, D., et al., "A Study of Proactive Hybrid FEC/ARQ and Scalable Feedback Techniques for Reliable, Real-Time Multicast", Computer Communications, Elsevier Science Publishers BV, Amsterdam, NL, vol. 24, No. 5/6, Mar. 15, 2001, pp. 563-574. (XP00150265).

Park, K., et al., "QoS-sensitive transport of real-time MPEG video using adaptive redundancy control", Computer Communications, Elsevier Science Publishers BV, Amsterdam, NL, vol. 24, No. 1, Jan. 1, 2001, pp. 78-92. (XP004227543).

Nafaa, A et al., "Unequal and interleaved FEC protocol for robust MPEG-4 multicasting over wireless LANs", Communications, 2004, IEEE International Conference on Paris, France. IEEE, Jun. 20, 2004, pp. 1431-1435. (XP010710497).

Abhik, Majumdar et al., "Multicast and Unicast Real-Time Video Streaming Over Wireless LANs", IEEE Transactions on Circuits and Systems for Video Technology, IEEE Service Center. vol. 12, No. 6, Jun. 2002, pp. 524-534. (XP011071837).

Philip A Chou et al., "Error Control for Reciever-Driven Layered Multicast of Audio and Video", IEEE Transactions on Multimedia. p. 108-122, 2001.

Sasaki C., et al., "Establishment of Encryption Authentication Proxy Server and Test of UDP Packet Distribution", A Research Report of the Institute of Electronics, Information and Communication Engineers (IEICE), Japan, General Incorporated Association of the Institute of Electronics, Information and Communication Engineers, The Institute Electro, Feb. 25, 2005, vol. 104, No. 692, pp. 223-226.

Suzuki T., et al., "Study on FEC/ARQ Hybrid Control Method for Mobile-multicast Communications", the Special Interest Group Notes of the Information Processing Society of Japan, the General Incorporated Association of the Information Processing Society, Mar. 8, 2002, vol. 2002, No. 24, p. 75-82.

* cited by examiner

SYSTEM FOR EARLY DETECTION OF DECODING ERRORS

CLAIM OF PRIORITY UNDER 35 U.S.C. §119

The present Application for Patent claims priority to Provisional Application No. 60/721,824 entitled "METHOD FOR EARLY DETECTION OF DECODE FAILURES" filed Sep. 28, 2005, and assigned to the assignee hereof and hereby expressly incorporated by reference herein.

FIELD

Background

The present Application for Patent relates generally to communication systems, and more particularly, to a system for early detection of decoding errors for use in a communication system.

In typical wireless delivery systems, content is delivered to portable devices over a multicast transmission channel. The content is in the form of data packets that are coded to overcome packet loss that may occur as packets are transmitted over the transmission channel. An encoder at a transmitter takes the original data packets and produces code packets that are transmitted to one or more devices. Because of noise or other degrading transmission effects, a subset of the code packets is received at any particular device. The received code packets are decoded to recover the original data packets.

The success of the decoding process depends on the number of received code packets. In general, if the number of data packets is "k", the number of received code packets should be at least $k(1+\epsilon)$ where epsilon ($\epsilon$) is a communication overhead factor, (e.g., 10% of k). Choosing a higher value of $\epsilon$ lowers the probability of decoding failure, but may increase decoding time and/or battery consumption at the device.

Conventional systems typically fix the value of $\epsilon$ to achieve selected decoding performance assuming a worst case transmission environment. However, it is generally uncommon for the transmission channel to perform according to the worst case assumptions. As a result, many unnecessary packets are received by a receiving device. For example, assuming the worst case transmission environment results in fixing the value of $\epsilon$ to be very large. This causes many additional and unnecessary packets to be received for the purpose of decoding the data. This places a large burden on the resources of the receiving device because it requires additional power, CPU time, memory, and file system resources to receive and process the unnecessary packets.

Therefore, it would be desirable to have a system that operates to adjust the number of received packets based on the quality of the transmission channel to obtain selected decoder performance. The system should also operate to perform early error detection so that the number of received packets can be adjusted to produce selected decoder performance without having to wait for the results of the decoding process.

SUMMARY

In one or more embodiments, a decoding system is provided that operates to adjust the number of received packets based on the quality of the transmission channel to obtain selected decoder performance. In one embodiment, the system adjusts the number of received packets based on one or more trigger events. For example, one trigger event is associated with the failure of the decoding process. One or more other trigger events are associated with the early detection of errors so that the number of received packets can be adjusted to achieve selected decoder performance without having to wait for the results of the decoding process. The system is especially suited for use in wireless communication systems to allow data to be received/recovered by a portable device while minimizing the impact on device resources such as power consumption, memory, CPU time, and files accesses, etc.

In one embodiment, a method is provided for detecting a decode failure. The method comprises receiving an initial amount of code packets, detecting a trigger event that indicates a decode failure associated with the initial amount of code packets, and receiving one or more additional code packets.

In one embodiment, apparatus is provided for detecting a decode failure. The apparatus comprises receiving logic configured to receive an initial amount of code packets, and to receive one or more additional code packets when a trigger event is detected, and processing logic configured to detect the trigger event, wherein the trigger event indicates a decode failure associated with the initial amount of code packets.

In one embodiment, apparatus is provided for detecting a decode failure. The apparatus comprises means for receiving an initial amount of code packets, means for detecting a trigger event that indicates a decode failure associated with the initial amount of code packets, and means for receiving one or more additional code packets.

In one embodiment, a computer-readable media is provided that comprises instructions, which when executed by at least one processor, operate to detect a decode failure. The computer-readable media comprises instructions for receiving an initial amount of code packets, instructions for detecting a trigger event that indicates a decode failure associated with the initial amount of code packets, and instructions for receiving one or more additional code packets.

In one embodiment, at least one processor is provided that is configured to perform a method for detecting a decode failure. The method comprises receiving an initial amount of code packets, detecting a trigger event that indicates a decode failure associated with the initial amount of code packets, and receiving one or more additional code packets.

Other aspects of the embodiments will become apparent after review of the hereinafter set forth Brief Description of the Drawings, Detailed Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DESCRIPTION

The following description describes one or more embodiments of a decoding system. The decoding system operates to adjust the number of received packets based on the quality of a transmission channel to obtain selected decoder performance. The system is especially well suited for use in portable devices having limited resources, but may be used with any type of device. The system may also be used in devices operating in any type of network environment, including but not limited to, communication networks, public networks, such as the Internet, private networks, such as virtual private networks (VPN), local area networks, wide area networks, long haul networks, or any other type of data or communication network.

Figure 1:
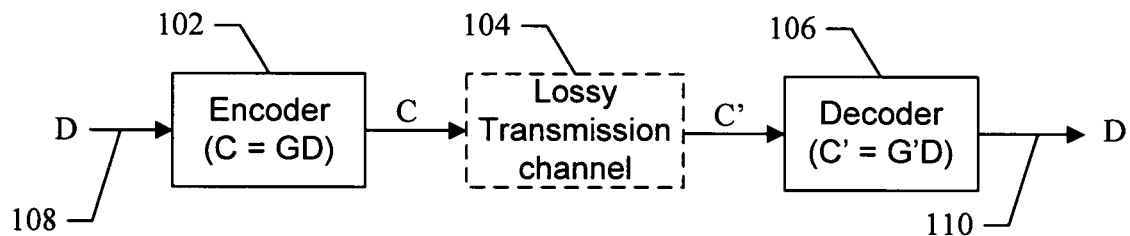
FIG. 1 shows a communication path that comprises one embodiment of a decoding system.

FIG. 1 shows a communication path 100 that comprises one embodiment of a decoding system. For example, the communication path 100 may be used to deliver content to one or more portable devices. The communication path 100 comprises an encoder 102, a transmission channel 104 and a decoder 106.

In one embodiment, the encoder 102 performs message coding on data packets to be transmitted over the transmission channel 104. The message coding is performed because the transmission channel 104 may be a lossy channel (or erasure channel) that causes transmitted packets to be lost. The message coding provides redundancy that allows lost data packets to be recovered. In one embodiment, message coding is performed using an encoding technology referred to as Low Density Generator Matrix (LDGM) technology. However, other types of message coding may be utilized in other embodiments.

In one embodiment, the encoder 102 receives data packets D (shown at 108) and encodes them to produce code packets C. The code packets C comprise two types of packets. The first type of code packet comprises a packet header and data from a selected data packet. The second type of code packet comprises a packet header and data from one or more data packets that have been combined using any known combination algorithm, such as an exclusive "OR" algorithm. The packet header for the second type of code packet identifies which data packets have been combined and the type of combining algorithm used.

The code packets C are transmitted over the transmission channel 104 to one or more receiving devices. For example, the transmission of the code packets occurs during a contact window having a selected duration. A subset of the code packets C' is received by a decoder 106 located at one of the receiving devices. The decoder 106 operates to process the received code packets C' to recover the original data packets D (shown at 110).

The decoding process depends on the number of received code packets C'. In general, if the number of data packets D transmitted is equal to "k", the number of received code packets (C') should be at least $k(1+\epsilon)$. Choosing a higher value of $\epsilon$ lowers the probability of decoding failure, but may result in unnecessary packets being received and increased decoding time and/or power consumption at the decoder 106.

In one embodiment, the decoding system operates to adjust the number of received code packets C' based on one or more trigger events. During operation, the decoder 106 is initialized with an initial minimum value for $\epsilon$. The decoder then attempts to receive $k(1+\epsilon)$ code packets during a contact window in which a broadcast occurs. During or after the reception of the code packets one or more trigger events may occur. For example, trigger events may occur if the quality of the transmission channel is very poor. If a trigger event occurs, the system increases the number of code packets C' it receives to decode the data. Thus, the system operates to adjust the number of received code packets C' based on the quality of the transmission channel. A detailed description of the various trigger events is provided in another section of this document.

In one embodiment, the decoder 106 receives $k(1+\epsilon)$ code packets. The code packets are then decoded to recover the original data D. A decode error trigger event occurs if the decode process fails. For example, the decoding process may fail because too many code packets were lost in transmission as a result of the poor quality of the transmission environment. In this case, the value of $\epsilon$ is increased and the decoder 106 operates to receive more code packets during the contact window. As a result, the decoding system adjusts the decoder 106 to receive enough code packets C' to obtain selected decoding performance. This provides very efficient operation of the decoder 106 because a small initial value for $\epsilon$ may be used. If the transmission channel provides adequate performance, it is not necessary to increase $\epsilon$ so that large numbers of unnecessary code packets C' need not be received. Thus, the decoding system operates to conserves devices resources, such as power consumption, CPU processing time, memory, and file accesses, etc.

In one embodiment, the decoding system operates to perform one or more of the following functions.
1. Set an initial value for $\epsilon$.
2. Receive a selected amount of code packets C' as determined by $\epsilon$.
3. Decode the received code packets C'.
4. Determine if a decode error trigger event has occurred.
4. If a decode error trigger has occurred, increase the value of $\epsilon$ and receive additional code packets C'.
5. Decode the data from all received code packets C'.

In another embodiment, the decoder 106 attempts to receive $k(1+\epsilon)$ code packets during a contact window in which a broadcast occurs. As code packets C' are received, information about the amount of correctly received code packets is maintained. The information is stored at the decoder 106 and used to determine one or more trigger events that indicate how successful code packets are being received. For example, in one embodiment, the information is used to determine a receive ratio that indicates how many good packets are received as compared to the total number of packets. In one embodiment, this information is maintained in a tree structure that requires a selected amount of memory to maintain. A first type of early error detection trigger event is determined if the receive ratio falls below a selected threshold. Another type of early error detection error trigger event is determined if the memory required for the tree structure exceeds a selected threshold. When an early error detection trigger events occur, the value of $\epsilon$ is increased such that all remaining code packets in the contact window are received by the decoder. The decoder then processes all the received code packets to recover the original data.

In one embodiment, the decoding system operates to perform one or more of the following functions.
1. Set an initial value for $\epsilon$.
2. Begin receiving code packets C'.
3. Determine if an early error detection trigger event has occurred.
4. If an early error detection trigger event has occurred, increase $\epsilon$ to receive all code packets C' remaining in the contact window.
5. Decode the data from the all the received code packets C'.

Thus, the decoding system operates to efficiently adjust the number of receive code packets based on the quality of the transmission channel. As a result, decoding system operates to minimize the number of unnecessary code packets received when the transmission channel is providing selected performance.

Figure 2:
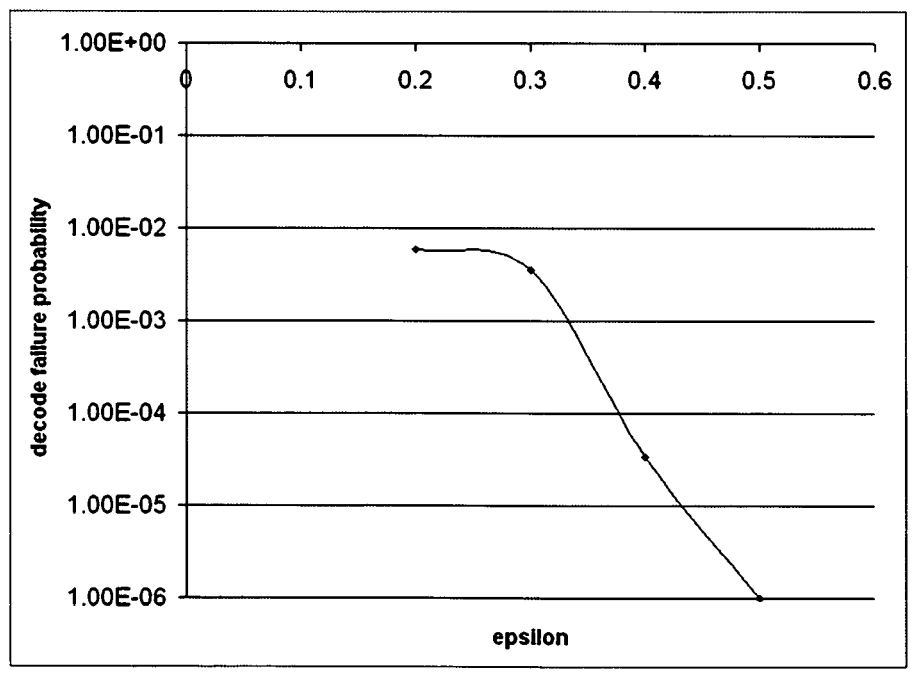
FIG. 2 shows a graph that illustrates a relationship between decoding failure probability and epsilon.

FIG. 2 shows a graph 200 that illustrates "decoding failure probability" versus $\epsilon$. As the graph 200 illustrates, the probability of decode failure is around 0.01 for a value of $\epsilon$ of approximately 0.2. The probability of decode failure is reduced to around $10^{-6}$ for a value of $\epsilon$ of approximately 0.5. In one or more embodiments of a decoding system, small initial values of $\epsilon$ may be used to achieve the same or better decoding performance as that of conventional systems using larger values of $\epsilon$. As a result, fewer unnecessary code packets are received and therefore less resources of the decoding device are required.

Figure 3:
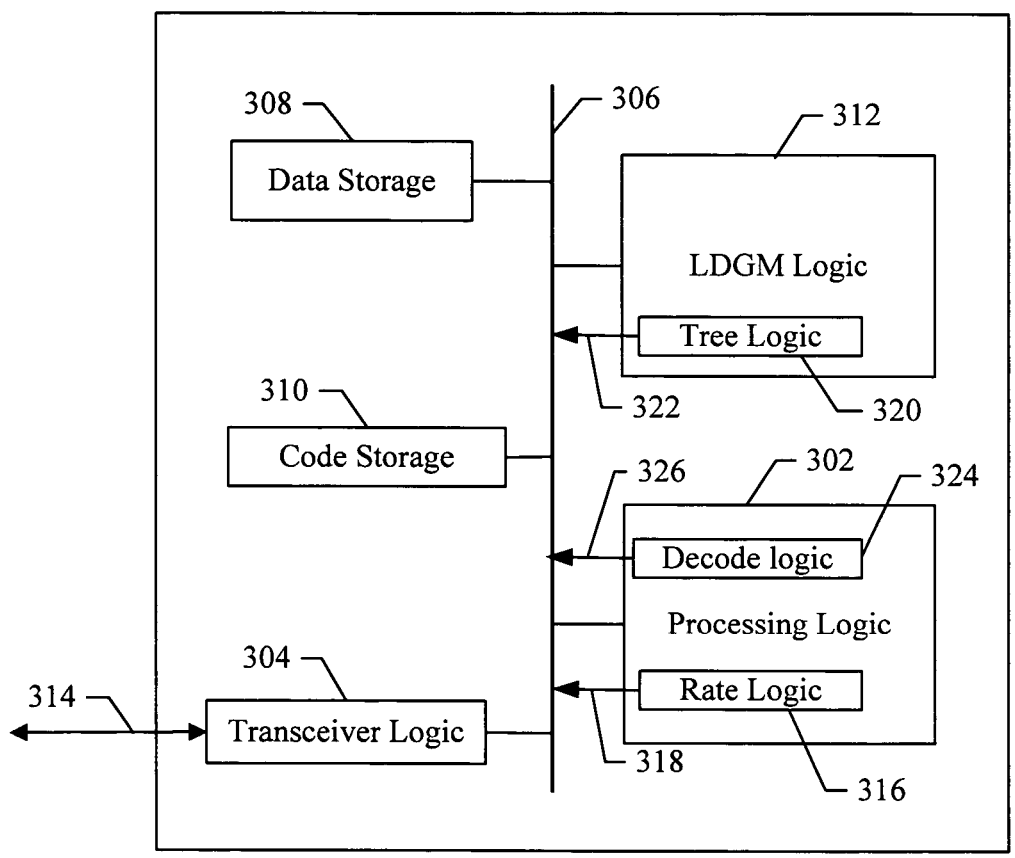
FIG. 3 shows one embodiment of a decoder for use in embodiments of a decoding system.

FIG. 3 shows one embodiment of a decoder 300 for use in embodiments of a decoding system. For example, the decoder 300 is suitable for use as the decoder 106 shown in FIG. 1. The decoder 300 comprises processing logic 302 and transceiver logic 304 that are coupled to an internal data bus 306. The decoder 300 also comprises data storage 308, code storage 310 and LDGM logic 312, which are also coupled to the data bus 306.

In one or more embodiments, the processing logic 302 comprises a CPU, processor, gate array, hardware logic, memory elements, virtual machine, software, and/or any combination of hardware and software. Thus, the processing logic 202 generally comprises logic to execute machine-readable instructions and to control or communicate with one or more other functional elements of the decoder 300 via the internal data bus 306.

The transceiver logic 304 comprises hardware logic and/or software that operate to allow the decoder 300 to transmit and receive data and/or other information with remote devices or systems using communication channel 314. For example, in one embodiment, the communication channel 314 comprises any suitable type of communication channel 314 to allow the decoder 300 to communicate with a data network. For example, in one embodiment, the transceiver logic 304 operates to receive code packets from a remote server through the communication channel 314. The decoder 300 then operates to process the received code packets to recover the original data that was transmitted from the remote server.

The data storage 308 comprises any suitable memory device operable to store data. For example, the data storage 308 may comprise RAM, Flash memory, EEPROM, hard disk, and/or any other type of storage device. In one embodiment, the data storage 308 operates to store data that is decoded from code packets received by the transceiver logic 304.

The code storage 310 comprises any suitable memory device operable to store code packet information. For example, the code storage 308 may comprise RAM, Flash memory, EEPROM, hard disk, and/or any other type of storage device. In one embodiment, the code storage 310 operates to store code information that is included in code packets received by the transceiver logic 304. For example, in one embodiment, the code information comprises information associated with the second type of code packet as described above.

The LDGM logic 312 comprises a CPU, processor, gate array, hardware logic, memory elements, virtual machine, software, and/or any combination of hardware and software. Thus, the LDGM logic 202 generally comprises logic to execute machine-readable instructions and to control or communicate with one or more other functional elements of the decoder 300 via the internal data bus 306.

In one embodiment, the processing logic 302 comprises rate logic 316 which operates to determine a ratio for received code packets. For example, the ratio describes the number of good code packets received as compared to the total code packets. Thus, if one hundred code packets are transmitted and only ninety code packets are successfully received, the rate logic 316 determines the ratio to be 90/100 or 90%. If the ratio falls below a selected rate threshold, then the rate logic 316 generates a first type of early error detection trigger event 318. In one embodiment, the rate threshold is transmitted to the rate logic 316 from a remote server, and in another embodiment, the rate threshold is pre-stored in the rate logic 316 during device manufacture.

In one embodiment, the LDGM logic 312 comprises tree logic 320 configured to process received code packets to generate a tree structure or database that describes the relationships between received/recovered code packets. In one embodiment, the generated tree structure is stored in a memory at the LDGM logic 312. A more detailed description of the tree structure is provided in another section of this document. In one embodiment, the tree logic 320 operates to generate a second type of early error detection trigger event 322 when the memory required for the tree structure exceeds a selected memory threshold. In one embodiment, the memory threshold is transmitted to the tree logic 320 from a remote server, and in another embodiment, the rate threshold is pre-stored in the tree logic 320 during device manufacture.

In one embodiment, the processing logic 302 comprises decoder logic 324 which operates to decode received code packets to detect decode failures. For example, the decoder 300 receives $k(1+\epsilon)$ code packets through the transceiver logic 304 and decodes those packets to determine the original data. If any selectable type or amount of decode errors are detected, the decode logic 324 operates to output a decode error trigger event 326, which indicates that a decode error has occurred.

During operation of one or more embodiments, an initial value for $\epsilon$ is downloaded from a remote server through the transceiver logic 304. In another embodiment, the initial value of $\epsilon$ is pre-stored at the decoder during manufacture.

In one embodiment, the decoder 300 operates to adjust the number of received code packets as a result of a decode error trigger event by performing one or more of the following functions.
1. An initial value of $\epsilon$ is set.
2. A total of $k(1+\epsilon)$ code packets are received and stored in the code storage 310 and the data storage 308.
3. The received code packets are decoded by the decoding logic 324.
4. A decode error trigger event 326 is generated if there is a decoder failure based on any pre-selected decode criteria.
5. The processing logic 302 detects the decode error trigger event 326 and increments the value of $\epsilon$.
6. The increased value of $\epsilon$ is used by the transceiver logic 304 to collect additional code packets.
7. The decode logic 324 then decodes the data from all received code packets.
8. For the next data session, the value of $\epsilon$ is reset to its initial value.

In one embodiment, the decoder 300 operates to adjust the number of received code packets as a result of an early error detection trigger event by performing one or more of the following functions.
1. An initial value of $\epsilon$ is set.
2. Code packets are received
3. The tree logic 320 operates to construct a tree of the received code packets.

4. If the ratio of received to transmitted code packets falls below a selected rate threshold an early error detection trigger event is generated by the rate logic 316.
5. If the amount of memory required for the tree structure exceeds a selected memory threshold an early error detection trigger event is generated by the tree logic 320.
6. If an early error detection event is generated, the value of $\epsilon$ is increased to allow some or all additional code packets transmitted in the contact window to be received.
7. All the received code packets are decoded by the decode logic 324.
8. For the next data session, the value of $\epsilon$ is reset to its initial value.

In one embodiment, the decoder 300 comprises one or more program instructions ("program instructions") stored on a computer-readable media, which when executed by at least one processor, for instance, the processing logic 302, provides the functions described herein. For example, the program instructions may be loaded into the decoder 300 from a computer-readable media, such as a floppy disk, CDROM, memory card, FLASH memory device, RAM, ROM, or any other type of memory device or computer-readable medium that interfaces to the decoder 300. In another embodiment, the instructions may be downloaded into the decoder 300 from an external device or network resource that interfaces to the decoder 300 through the transceiver logic 304. The program instructions, when executed by the processing logic 302, provide embodiments of a decoding system as described herein.

As a result, embodiments of the decoding system operate to process received code packets to recover data transmitted over a lossy transmission channel. The system operates to adjust the amount of code packets that are received based on one or more trigger events. Thus, embodiments of the decoding system operate to minimize the amount of unnecessary packets received so that device resources may be efficiently utilized.

Figure 4:
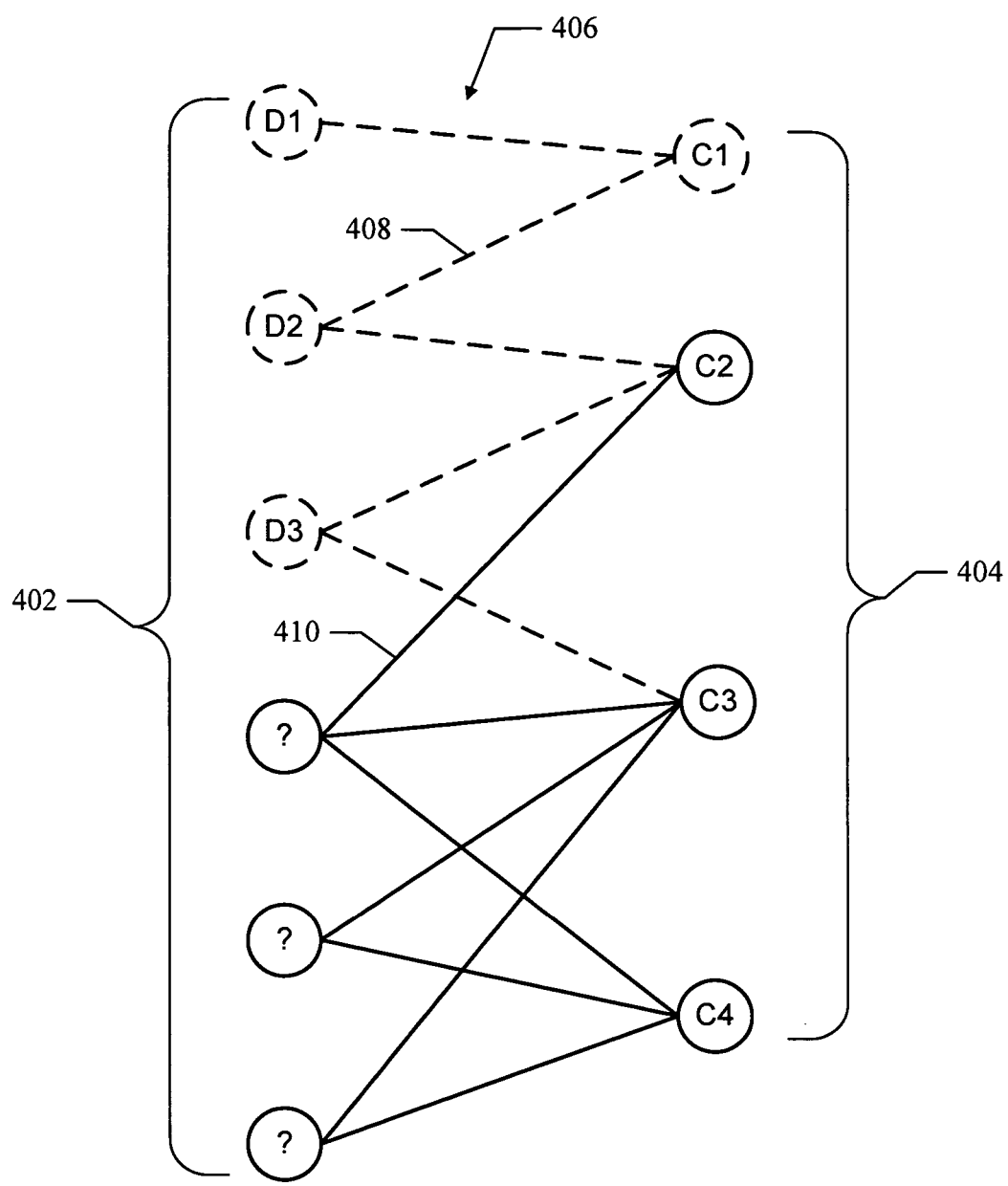
FIG. 4 shows one embodiment of a tree structure for use in embodiments of a decoding system.

FIG. 4 shows one embodiment of a tree structure 400 for use in embodiments of a decoding system. In one embodiment, the tree structure 400 is generated and maintained at the LDGM logic 312. The tree structure 400 comprises data 402 and combined data 404 that are obtained from received code packets. For example, the combined data 404 is provided in the second type of code packet described above. The tree structure 400 also comprises edge structures 406 that describe the relationship between the data 402 and the combined data 404.

During operation of the decoding system, code packets are received by the transceiver logic 304 and the data and combined data they contain are stored in the data storage 308 and code storage 310, respectively. The LDGM logic 312 processes information in the data storage 308 and the code storage 310 to construct the tree structure 400 so that it is possible to keep track of how many packets have been successfully received and which packets need to be recovered. Thus, the tree structure 400 provides a performance indicator in that it is possible to determine how many packets have been lost and how many packets have been successfully received.

In one embodiment, as the tree structure 400 is generated, portions of the tree structure 400 are added and portions of the tree structure are pruned. For example, once data is successfully recovered, edge structures are pruned, as shown by 408 and indicated by dashed lines. As additional packets are received and some packets lost, additional edge structures are added, as shown at 410 and indicated with solid lines. The ongoing addition and pruning of the tree structure 400 results in a certain amount of storage being allocated to store the tree structure 400. The amount of storage that is allocated for the tree structure 400 is an indicator that describes the number of packets that are lost in transmission.

Thus, the tree structure 400 provides several indicators pertaining to the operation of the decoding system. For example, the tree structure 400 indicates which packets have been successfully recovered and which have not. The tree structure 400 also indicates the number of lost packets. For example, a large tree structure indicates that a large number of packets have not been successfully received.

Trigger Events

In one or more embodiments, the decoding system operates to adjust the number of received code packets based on one or more trigger events. Two types of trigger events are described herein, although more types are possible within the scope of the embodiments. One type of trigger event is an early error detection trigger event. An early error detection trigger event occurs before or during the decoding process to indicate that the decoding of the received packets will be unsuccessful. The early error detection trigger event occurs before the decoding is completed so that it is possible to stop the decoding process to take corrective action, thereby conserving device resources and processing time.

Another type of trigger event is a decoding failure trigger event. The decoding failure trigger event occurs once the decoding process is complete and it indicates that there has been a decoding failure.

The following provides a detailed description of various trigger events. It should be noted that the system is not limited to using only the trigger events described below and that other trigger events may be defined and utilized within the scope of the embodiments.

Early Error Detection Trigger Events

The following is a description of two types of early error detection trigger events. These events are detected before the completion of the decoding process so that the decoding system can take corrective action without having to wait for the result of the decoding process.

Memory Utilization Trigger Event

In one embodiment, the decoding system operates to detect a memory utilization trigger event. For example, if a tree structure maintained by the tree logic 320 exceeds a selected memory threshold then the memory utilization trigger event is generated.

Receive Ratio Trigger Event

In one embodiment, the decoding system operates to detect a receive ratio trigger event. For example, if the rate logic 316 determines that the rate of successfully received packets falls below a selected threshold, then the received ratio trigger event is generated.

Decoding Failure Trigger Event

The following is a description of a decoding failure trigger event. This event is detected at the completion of the decoding process so that the decoding system can take corrective action with respect to the next receiving session.

Decoding Failure Trigger Event

The decoding failure trigger event is generated if the decoding process for a selected session of received code packets fails. For example, the decoder 300 operates to receive $k(1+\epsilon)$ code packets transmitted within a selected contact window. If there is a failure in decoding the received code packets then the decoding failure trigger event is generated. A decoding failure may be defined by any desired decoding criteria. In one embodiment, the decoding logic 324 operates to decode the received code packets and generate the decoding failure trigger event 326 if a decoding failure is detected.

Figure 5:
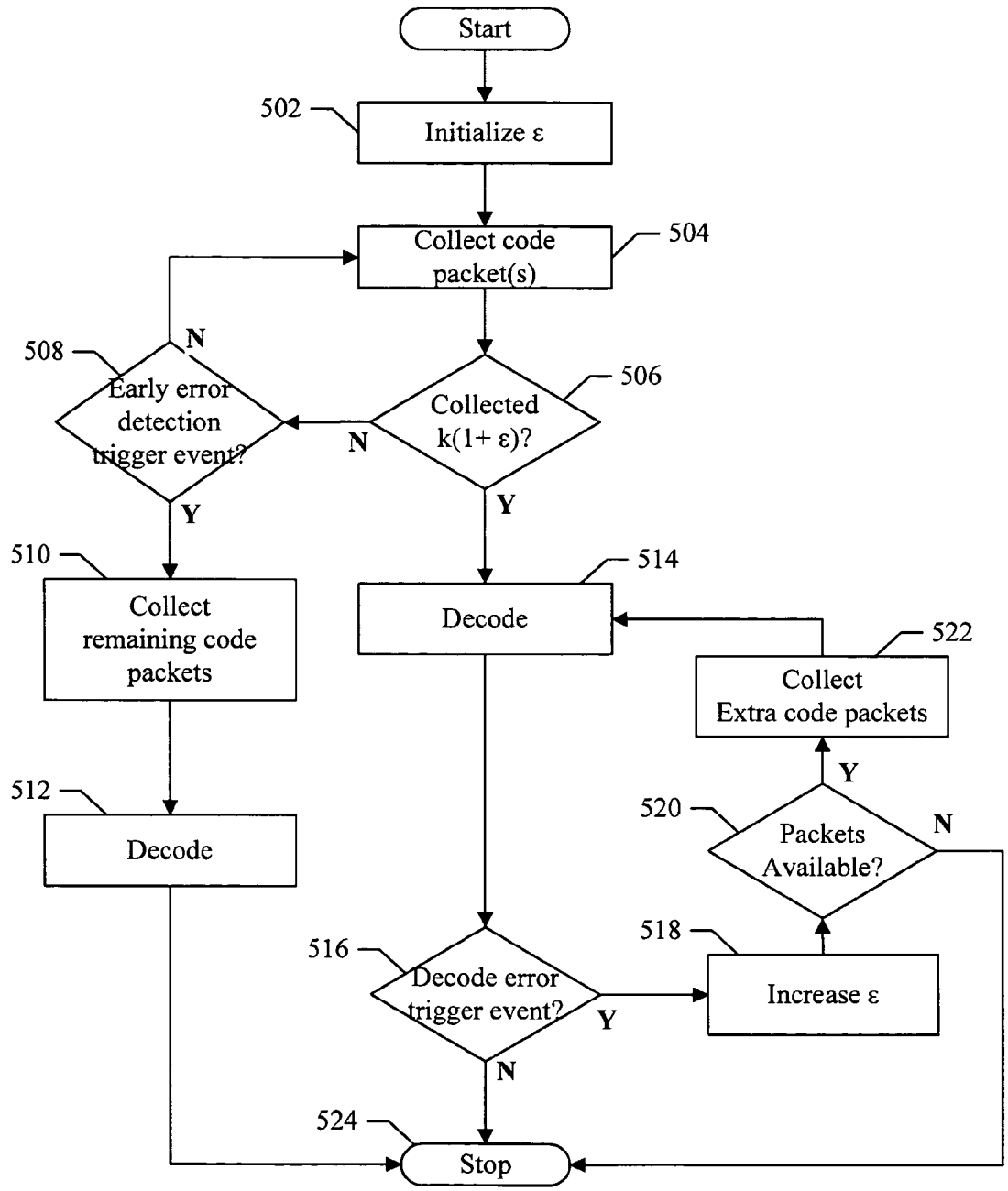
FIG. 5 shows one embodiment of a method for use in embodiments of a decoding system.

FIG. 5 shows one embodiment of a method 500 for use in embodiments of a decoding system. For clarity, the method 500 is described herein with reference to the decoder 300 shown in FIG. 3. For example, in one embodiment, the processing logic 302 executes machine-readable instructions to perform the functions described below.

At block 502, a value of $\epsilon$ is initialized to a minimum value for the decoding system. For example, in one embodiment, the value of $\epsilon$ is downloaded to the decoder 300 from a remote server through the transceiver logic 304 and stored at the processing logic 302. In one embodiment, the initial value of $\epsilon$ is approximately 0.1.

At block 504, one or more code packets are received. For example, the code packets may be transmitted to the decoder 300 over a multicast transmission channel within a selected contact window and received by the transceiver logic 304. As the code packets are received, the information they contained is stored in the data storage 308 and the code storage 310 as necessary. Additionally, the LDGM logic 312 constructs a tree structure as shown in FIG. 4.

At block 506, a test is performed to determine if all desired code packets have been received. For example, the decoder 300 attempts to receive $k(1+\epsilon)$ code packets. If all the code packets have been received the method proceeds to block 514. If all the code packets have not been received the method proceeds to block 508.

At block 508, a test is performed to determine if an early error detection trigger event has occurred. For example, in one embodiment, the rate logic 316 and the tree logic 320 operate to determine if early error detection trigger events 318, 322 have occurred. If an early error detection event has not occurred, the method proceeds back to block 504 where more code packets are received. If an early error detection event has occurred, the method proceeds to block 510.

At block 510, all or a selectable portion of the remaining code packets in the contact window are received. For example, the processing logic 302 is aware of the duration of a contact window in which code packets are being transmitted. The processing logic 302 operates to control the transceiver 304 to receive code packets for the remaining part of the contact window so that the decoder 300 may receive any more code packets that are transmitted. In one embodiment, the value of $\epsilon$ is increased to include all remaining code packets.

At block 512, the received code packets are decoded. For example, the processing logic 302 decodes all the code packets received to recover as much of the transmitted data as possible. The recovered data is stored in the data storage 308. The method then ends at block 524.

At block 514, the received $k(1+\epsilon)$ code packets are decoded. For example, the processing logic 302 decodes the $k(1+\epsilon)$ code packets to recover as much of the transmitted data as possible.

At block 516, a test is performed to determine if a decode error trigger event has occurred. For example, a decode error trigger event 326 occurs if the decode logic 324 detects a failure (as described above) in decoding the received code packets. If the decode process was successful, the method ends at block 524. If a decoding error is detected, the decode error trigger event is detected, the method proceeds to block 518.

At block 518, the value of $\epsilon$ is increased. For example, in one embodiment, the processing logic 302 increases the value of $\epsilon$ by any selected amount.

At block 520, a test is performed to determine if more packets are available to be received. For example, code packets are transmitted over the duration of a contact window. The test determines if the contact window is still open so that more packets may be received. In one embodiment, the processing logic 302 determines if the contact window is still open. If the contact window has closed so that there are no more packets to receive, the method ends at block 524. If the contact window is still open so that there are more packets to receive, the method proceeds to block 522.

At block 522, additional code packets are received. In one embodiment, the processing logic 302 controls the transceiver logic 304 to receive more code packets. As the packets are being received, the information they contain is stored in the data storage 308 and the code storage 310 as necessary. The method then proceeds to block 514 where all the received code packets are decoded.

Thus, the method 500 operates to provide one embodiment of a decoding system for use in a device. It should be noted that the method 500 represents just one implementation and that other implementations are possible within the scope of the embodiments.

Figure 6:
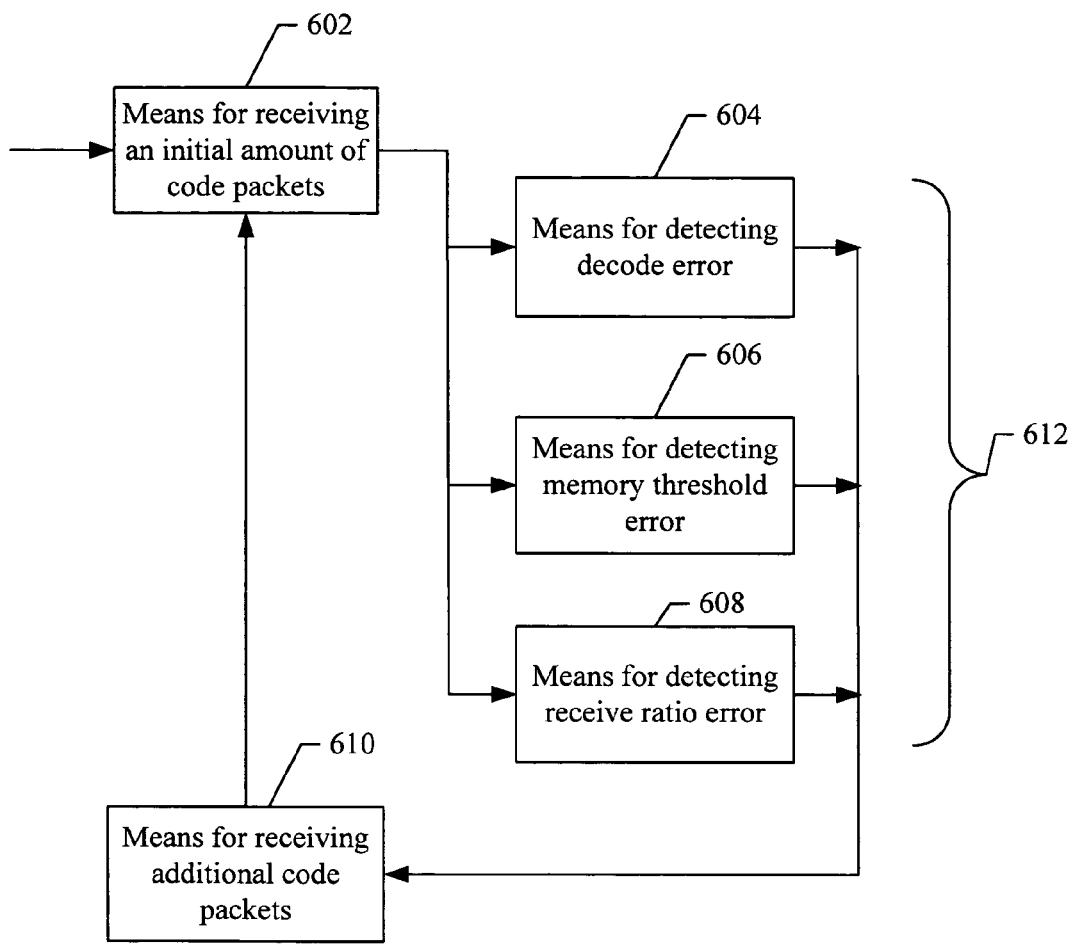
FIG. 6 shows one embodiment of a decoder for use in embodiments of a decoding system.

FIG. 6 shows one embodiment of a decoder 600 for use in embodiments of a decoding system. The decoder 600 comprises a means 602 for receiving an initial amount of code packets. For example, in one embodiment, the means 602 comprises the processing logic 302 controlling the transceiver logic 304 to receive $k(1+\epsilon)$ code packets.

The decoder 600 also comprises means 612 for detecting a trigger event. The means 612 comprises means 604 for detecting a decode error, means 606 for detecting a memory threshold error, and means 608 for detecting a receiving ratio error. For example, in one embodiment, the means 604 comprises the decode logic 324, the means 606 comprises the tree logic 320, and the means 608 comprises the rate logic 316.

The decoder 600 also comprises means 610 for receiving additional code packets. For example, in one embodiment, the means 610 comprises the processing logic 302 controlling the transceiver logic 304 to receive additional code packets within the duration of a contact window. Thus, the decoder 600 provides one embodiment of a decoding system.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments Accordingly, while one or more embodiments of a decoding system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for early detecting a decode failure, comprising:
   receiving code packets, wherein the code packets include at least one code packet comprising data and at least one code packet comprising combined data;
   constructing a tree using the code packets, wherein the step of constructing the tree comprises:
      adding the data from the code packets into the tree;
      adding the combined data from the code packets into the tree; and
      adding information into the tree describing a relationship between the data and the combined data; and
   detecting a trigger event while constructing the tree, wherein the trigger event is based, at least in part, on a memory utilization of the tree.

2. The method of claim 1, wherein receiving the code packets comprises receiving an initial amount C' of code packets that is equal to at least $k(1+\epsilon)$ when a number of data packets D transmitted is equal to "k."

3. The method of claim 2, wherein during operation of said method a decoder is initialized with an initial minimum value for $\epsilon$, wherein the minimum value for $\epsilon$ is greater than zero.

4. The method of claim 1, further comprising:
   receiving one or more additional code packets, based on the trigger event; and
   decoding the one or more additional code packets to construct the tree.

5. The method of claim 4, further comprising increasing a parameter to determine an amount of the one or more additional code packets.

6. The method of claim 5, further comprising resetting the parameter to an initial value for a subsequent receiving session.

7. The method of claim 4, wherein said receiving comprises receiving the one or more additional code packets within the duration of a contact window.

8. The method of claim 4, further comprising generating the trigger event based, at least in part, on a receive ratio indicator.

9. The method of claim 8, wherein said receiving comprises receiving the one or more additional code packets within the duration of a contact window.

10. The method of claim 1, wherein the step of inserting information into the tree describing a relationship comprises inserting an edge structure into the tree.

11. The method of claim 1, wherein the trigger event is based, at least in part, on a comparison between a metric based, at least in part, on the memory utilization of the tree and a threshold, wherein the trigger event indicates a decode failure associated with the code packets.

12. An apparatus for early detecting a decode failure, the apparatus comprising:
   a receiving logic device configured to receive code packets, wherein the code packets include at least one code packet comprising data and at least one code packet comprising combined data; and
   a processing logic device configured to:
      construct a tree using the received code packets, wherein the processing logic device is configured to construct the tree by:
         adding the data from the code packets into the tree;
         adding the combined data from the code packets into the tree; and
         adding information into the tree describing a relationship between the data and the combined data; and
      detect the trigger event generated while constructing the tree, wherein the trigger event is based, at least in part, on a memory utilization of the tree.

13. The apparatus of claim 12, further comprising a decode logic device for decoding the code packets to generate the trigger event.

14. The apparatus of claim 12, in which the receiving logic device is configured to receive an initial amount C' of code packets that is equal to at least $k(1+\epsilon)$ when a number of data packets D transmitted is equal to "k."

15. The apparatus of claim 14, wherein $\epsilon$ is greater than zero.

16. The apparatus of claim 12, in which the processing logic device is further configured to:
   receive one or more additional code packets, based on the trigger event; and
   decode the code packets and the one or more additional code packets to obtain transmitted data.

17. The apparatus of claim 16, further comprising a decode logic device configured to decode the code packets and the one or more additional code packets to obtain transmitted data.

18. The apparatus of claim 16, further comprising a logic device configured to increase a parameter to determine an amount of the one or more additional code packets.

19. The apparatus of claim 18, further comprising the logic device configured to reset the parameter to an initial value for a subsequent receiving session.

20. The apparatus of claim 16, wherein said receiving logic device comprises a logic device configured to receive the one or more additional code packets within the duration of a contact window.

21. The apparatus of claim 16, further comprising the logic device configured to generate the trigger event based, at least in part, on a receive ratio indicator.

22. The apparatus of claim 21, wherein said receiving logic device comprises logic configured to receive the one or more additional code packets within the duration of a contact window.

23. The apparatus of claim 12, wherein the step of inserting information into the tree describing a relationship comprises inserting an edge structure into the tree.

24. The apparatus of claim 12, wherein the trigger event is based, at least in part, on a comparison between a metric based, at least in part, on the memory utilization of the tree and a threshold, wherein the trigger event indicates a decode failure associated with the code packets.

25. An apparatus for early detecting a decode failure, the apparatus comprising:
- means for receiving code packets, wherein the code packets include at least one code packet comprising data and at least one code packet comprising combined data;
- means for constructing a tree using the received code packets, wherein the tree constructing means comprises means for:
  - adding the data from the code packets into the tree;
  - adding the combined data from the code packets into the tree; and
  - adding information into the tree describing a relationship between the data and the combined data; and
- means for detecting a trigger event while constructing the tree, wherein the trigger event is generated based, at least in part, on a memory utilization of the tree.

26. The apparatus of claim 25, in which the receiving means comprises means for receiving an initial amount C' of code packets that is equal to at least k(1+ϵ), wherein ϵ is greater than zero, when a number of data packets D transmitted is equal to "k".

27. The apparatus of claim 25, further comprising means for receiving one or more additional code packets, based on the trigger event.

28. The apparatus of claim 27, further comprising means for decoding the code packets and the one or more additional code packets to obtain transmitted data.

29. The apparatus of claim 27, further comprising means for increasing a parameter to determine an amount of the one or more additional code packets.

30. The apparatus of claim 29, further comprising means for resetting the parameter to an initial value for a subsequent receiving session.

31. The apparatus of claim 27, wherein said means for receiving comprises means for receiving the one or more additional code packets within the duration of a contact window.

32. The apparatus of claim 27, further comprising means for generating the trigger event based, at least in part, on a receive ratio indicator.

33. The apparatus of claim 32, wherein said means for receiving comprises means for receiving the one or more additional code packets over the duration of a contact window.

34. The apparatus of claim 25, wherein the means for constructing the tree comprises means for inserting edge structures into the tree.

35. The apparatus of claim 25, wherein the trigger event is based, at least in part, on a comparison between a metric based, at least in part, on the memory utilization of the tree and a threshold, wherein the trigger event indicates a decode failure associated with the code packets.

36. A non-transitory computer-readable media comprising instructions, which when executed by at least one processor, operate to early detect a decode failure, the non-transitory computer-readable media comprising:
- instructions for receiving code packets, wherein the code packets include at least one code packet comprising data and at least one code packet comprising combined data;
- instructions for constructing a tree using the received code packets, wherein the instructions for constructing the tree comprise:
  - instructions for adding the data from the code packets into the tree;
  - instructions for adding the combined data from the code packets into the tree; and
  - instructions for adding information into the tree describing a relationship between the data and the combined data; and
- instructions for detecting a trigger event generated while constructing the tree, wherein the trigger event is based, at least in part, on a memory utilization of the tree.

37. The non-transitory computer-readable media of claim 36, further comprising instructions for generating the trigger event based, at least in part, on a receive ratio indicator.

38. The non-transitory computer-readable media of claim 37, wherein said instructions for receiving comprise instructions for receiving the one or more additional code packets over the duration of a contact window.

39. The non-transitory computer-readable media of claim 36, in which the instructions for receiving comprise instructions for receiving an initial amount C' of code packets that is equal to at least k(1+ϵ), when a number of data packets D transmitted is equal to "k."

40. The non-transitory computer-readable media of claim 39, wherein ϵ is greater than zero.

41. The non-transitory computer-readable media of claim 36, further comprising instructions for receiving one or more additional code packets, based on the trigger event.

42. The non-transitory computer-readable media of claim 41, further comprising instructions for decoding the code packets and the one or more additional code packets to obtain transmitted data.

43. The non-transitory computer-readable media of claim 41, further comprising instructions for increasing a parameter to determine an amount of the one or more additional code packets.

44. The non-transitory computer-readable media of claim 43, further comprising instructions for resetting the parameter to an initial value for a subsequent receiving session.

45. The non-transitory computer-readable media of claim 41, wherein said instructions for receiving comprise instructions for receiving the one or more additional code packets within the duration of a contact window.

46. The non-transitory computer-readable media of claim 36, wherein the instructions for inserting information into the tree describing a relationship comprises inserting edge structures into the tree.

47. The non-transitory computer-readable media of claim 36, wherein the trigger event is based, at least in part, on a comparison between a metric based, at least in part, on the memory utilization of the tree and a threshold, wherein the trigger event indicates a decode failure associated with the code packets.

48. At least one processor configured to perform a method for early detecting a decode failure, the method comprising:
- receiving code packets, wherein the code packets include at least one code packet comprising data and at least one code packet comprising combined data;
- constructing a tree using the received code packets, wherein the step of constructing the tree comprises:
  - adding the data from the code packets into the tree;
  - adding the combined data from the code packets into the tree; and
  - adding information into the tree describing a relationship between the data and the combined data; and detecting a trigger event generated while constructing the tree, wherein the trigger event is based, at least in part, on a memory utilization of the tree.

49. The processor of claim 48, wherein the method further comprises receiving an initial amount C' of code packets that is equal to at least $k(1+\epsilon)$ when a number of data packets D transmitted is equal to "k."

50. The processor of claim 49, wherein $\epsilon$ is greater than zero.

51. The processor of claim 48, wherein the method further comprises receiving one or more additional code packets, based on the trigger event.

52. The method of claim 51, further comprising decoding the code packets and the one or more additional code packets to obtain transmitted data.

53. The method of claim 51, further comprising increasing a parameter to determine an amount of the one or more additional code packets.

54. The method of claim 53, further comprising resetting the parameter to an initial value for a subsequent receiving session.

55. The method of claim 51, wherein said receiving comprises receiving the one or more additional code packets within the duration of a contact window.

56. The method of claim 51, further comprising generating the trigger event based, at least in part, on a receive ratio indicator.

57. The method of claim 56, wherein said receiving comprises receiving the one or more additional code packets within the duration of a contact window.

58. The method of claim 48, wherein the step of inserting information into the tree describing a relationship comprises inserting edge structures into the tree.

59. The processor of claim 48, wherein the trigger event is based, at least in part, on a comparison between a metric based, at least in part, on the memory utilization of the tree and a threshold, wherein the trigger event indicates a decode failure associated with the code packets.

* * * * *